United States Patent [19]  [11] 4,070,534
Jones et al.  [45] Jan. 24, 1978

[54] PRODUCING HEAT STABLE VINYL CHLORIDE POLYMERS AT LOW TEMPERATURES IN THE PRESENCE OF TETRAHYDROFURAN

[75] Inventors: Richard Augustus Jones, Avon Lake; Donald Edward Witenhafer, North Olmsted, both of Ohio

[73] Assignee: The B. F. Goodrich Company, Akron, Ohio

[21] Appl. No.: 668,534

[22] Filed: Mar. 19, 1976

Related U.S. Application Data

[63] Continuation-in-part of Ser. No. 534,672, Dec. 20, 1974, abandoned, which is a continuation of Ser. No. 401,367, Sept. 27, 1973, abandoned.

[51] Int. Cl.$^2$ ............................................. C08F 14/06
[52] U.S. Cl. ................................... 526/204; 526/321; 526/328; 526/330; 526/343; 526/344; 526/345

[58] Field of Search ............... 526/204, 321, 328, 330, 526/343, 344, 345

[56] References Cited

U.S. PATENT DOCUMENTS

| 3,523,109 | 8/1970 | Diessel et al. | 526/344 |
| 3,631,009 | 12/1971 | Meyer | 526/344 |
| 3,812,086 | 5/1974 | Stack | 526/344 |

FOREIGN PATENT DOCUMENTS 1,068,466  11/1959  Germany.

Primary Examiner—Harry Wong, Jr.
Attorney, Agent, or Firm—Roy P. Wymbs

[57] ABSTRACT

In the bulk or suspension polymerization of vinyl chloride and copolymerization of vinyl chloride with vinylidene monomers containing a terminal $CH_2=CH<$ group, increased heat stability is obtained in the polymers by conducting the polymerization at low temperatures in the presence of tetrahydrofuran (THF).

9 Claims, No Drawings

4,070,534

PRODUCING HEAT STABLE VINYL CHLORIDE POLYMERS AT LOW TEMPERATURES IN THE PRESENCE OF TETRAHYDROFURAN

CROSS REFERENCE TO RELATED APPLICATIONS

This application is a continuation-in-part of our co-pending application Ser. No. 534,672, filed Dec. 20, 1974, now abandoned, which in turn is a continuation of application Ser. No. 401,367, filed Sept. 27, 1973, now abandoned.

BACKGROUND OF THE INVENTION

In the field of free radical polymerization of vinyl monomers it is known that a wide range of temperatures may be employed, for example, from about −60° to over 100° C. When the polymerization temperature is decreased usually the molecular weight, and therefore, the melt viscosity increases which adversely affects the processability of the polymer, particularly for such applications as bottle making, film making, extrusion, and the like.

It has been proposed to employ chain transfer agents in the polymerization reaction medium. However, while most known chain transfer agents are useful for lowering the molecular weight of the polymers, they have an adverse effect on the heat stability of the polymer, such as polyvinyl chloride, which, in turn, has a bad effect on the processability of the polymer.

Thus it can be seen that just employing a lower temperature during polymerization does not produce the desired processable polymer for many applications. Further, when operating at very low temperatures (below 0° C.) costly and hard to control refrigeration equipment is needed.

Kinetic models for the polymerization of vinyl chloride, in bulk or aqueous suspension systems, show a two phase reaction, wherein part of the polymer is formed in solution in vinyl chloride while a part is formed in polymer swollen with vinyl chloride. The reaction rate in the polymer phase is faster than that in the monomer phase, so as more polymer is formed the overall polymerization rate increases and a progressively higher fraction is polymerized in the polymer phase. Examination of the polymer produced early in the reaction, and highest in solution polymer content, reveals that the polymer has an impaired heat stability. If the reaction is allowed to proceed to around 95% conversion, again, an impaired heat stability is observed, due to polymerization under monomer starved conditions. As pointed out, in these polymerization systems water is the suspension agent and the polymer produced is insoluble in both the water and the monomer.

SUMMARY OF THE INVENTION

It has been found that the heat or thermal stability of polymers made from vinyl chloride, or copolymers of vinyl chloride with one or more vinylidene monomers containing a terminal $CH_2=CH<$ group, is a strong function of the polymerization temperature. That is, the heat stability of the polymer increases or improves rapidly as the polymerization temperature decreases. It was further found that if certain predetermined amounts of tetrahydrofuran, a solvent for the polymer, were added to the polymerization system the heat stability of the polymer was still further enhanced in a predescribed polymerization temperature range and importantly, the desired molecular weight in the polymer could likewise be obtained. In other words, it is the combination of reduced temperature and solvent that gives the superb heat or thermal stability in the polymer and desired molecular weight. The same result cannot be achieved by the use of either one alone.

Accordingly, this invention involves a process for making polymers from vinyl chloride and copolymers of vinyl chloride with one or more vinylidene monomers containing a terminal $CH_2=CH<$ group having improved heat stability and improved relationship between heat stability and polymer melt flow, indicative of proper molecular weight, which enhances processability of the polymers produced, by polymerizing in aqueous bulk or suspension systems at reduced temperatures in the presence of tetrahydrofuran (THF).

DETAILED DESCRIPTION

In accordance with the present invention granular homopolymers and copolymers of vinyl chloride having increased heat stability over known commercial vinyl chloride polymers and copolymers and improved melt flow are produced in bulk or aqueous suspension polymerization systems by carrying out the polymerization reaction in the presence of tetrahydrofuran (THF) and at reduced temperatures, that is, at temperatures lower than those usually employed for like polymerization reactions. Temperatures in the range of from about 0° to about 60° C. are employed in the present new process. While the temperature is not critical, too high or too low a temperature will give polymers with poor processability for the usual end uses. For example, when the temperature goes much above 60° C. the molecular weight of the polymer produced is so low as to be practically useless in normal vinyl chloride polymer applications.

However, while the temperature is not critical, since polymers can be made outside the range given, there is a correlation between the temperature used and the amount of THF employed to give optimum physical properties and maximum heat stability. The amount of THF employed is in the range of from about 5 parts by weight to about 100 parts by weight, based on the weight of 100 parts of vinyl chloride monomer used, or, in the case of copolymers, the combined weight of the vinyl chloride and the other copolymerizable monomer or monomers to be copolymerized therewith. The higher the temperature the less THF needed to obtain the desired results, including desired molecular weight. Again, at a given temperature the THF may be varied to get varying physical properties. However, for any given temperature there will be an optimum concentration of THF to produce a polymer having maximum heat stability characteristics. For example, when the polymerization reaction is conducted at 40° C. the THF concentration can be varied between 5 parts and 50 parts by weight, based on the weight of the monomer(s), and still obtain improved heat stability in the polymer. However, the maximum heat stability in the polymer is obtained at a polymerization reaction temperature of 40° C. when using 15 parts of THF.

If less than 5 parts by weight of THF is employed the thermal stability of the polymer is not enhanced. If more than 50 parts by weight of THF is employed it leads to inferior thermal stability in the polymer produced.

By incorporating small amounts, i.e., 5 parts to 50 parts by weight, of THF in the polymerization reaction mixture an increase in the amount of solution polymer formed occurs. More importantly, however, THF acts as a solubilizing or coupling agent for the vinyl chloride polymer and monomer which allows polymerization to take place in the polymer phase under conditions that are more monomer rich than in conventional bulk or suspension polymerization systems. Further, THF, in addtion to being a solvent, is a weak chain transfer agent and thus the molecular weight of the polymer can be effectively controlled by the concentration of THF used and without significant harm to the heat stability of the polymer.

In addition to the correlation between the polymerization temperature employed and the amount of THF used, to give maximum heat stability, the amount of conversion of monomer or monomers to polymer is important. Usually a percentage conversion up to about 80% gives improved heat stability in the polymer when employing the present invention. However, when the percent conversion is allowed to exceed 80%, it has an adverse effect on the heat stability of the polymers. Accordingly, it is important that the total conversion does not exceed 80%.

As previously pointed out, this invention not only produces improved heat stable granular homopolymers of vinyl chloride but also improved heat stable granular copolymers of vinyl chloride containing about 80% or more of vinyl chloride and about 20% or less of copolymerizable vinylidene monomers containing a terminal $CH_2=C<$ group. Suitable vinylidene monomers include, for example, any of those known to those skilled in the art to be copolymerizable with vinyl chloride including, but not limited to, other vinyl halides; vinylidene chloride; vinyl esters such as vinyl acetate and vinyl butyrate; esters of acrylic and methacrylic acid such as methyl acrylate, the butyl acrylates, isooctyl acrylate, methyl methacrylate and hexyl methacrylate; maleate and fumarate esters such as diethyl maleate and dipropyl fumarate; monoolefins including ethylene, propylene and butylene; vinyl ethers such as vinyl ethyl ether; allyl esters such as allyl acetate, diallyl phthalate; and the like.

The vinyl chloride polymerization reaction is normally carried out under pressure in the presence of a suitable monomer-soluble, water-insoluble free radical producing catalyst. Suitable catalysts for use in the present invention include, by way of example, lauryl peroxide, caprylyl peroxide, cyclohexane sulfonyl peroxide, acetyl cyclohexyl sulfonyl peroxide, acetyl sec-heptyl sulfonyl peroxide, hydrogen peroxide, methyl hydroperoxide, ethyl hydroperoxide, propyl hydroperoxide, butyl hydroperoxide, or other alkyl hydroperoxides, cumene hydroperoxide, isopropyl percarbonate, sec-butyl peroxydicarbonate, isobutyl peroxydicarbonate, and the like. The amount of the catalyst used is normally kept as low as possible consistent with a good polymerization rate. The catalyst chosen may also be used in combination with one or more other catalysts. The amount of catalyst used will depend upon the particular catalyst or catalysts chosen and the temperature of the polymerization reaction. Usually an amount of catalyst in the range of 0.001 weight part to about 1.0 weight part based on 100 weight parts of monomer(s) is sufficient.

Usually it is advantageous, although not always essential, depending on the end use of the polymer, to add to the liquid reaction media a small amount of a dispersant in order to obtain a more complete and uniform dispersal of the monomer(s) and catalyst throughout the reaction media prior to and during the polymerization reaction. When the porosity of the polymer or resin is important than a dispersant should be used, since the dispersant induces porosity in the resin subsequently formed. For example, when there is a need to remove the residual solvent, or THF, from the final product the resin should be porous. If the resin has little or no porosity, diffusion of THF from the resin particles is more difficult. Porosity of the resin or polymer is controlled by both the degree of conversion and by the amount and type of dispersant employed in the liquid reaction media. Among the suitable dispersants, which may be employed in the present invention are methyl cellulose, dodecylamine hydrochloride, sodium lauryl sulfonate, lauryl alcohol, sorbitan monolaurate polyoxyethylene, nonylphenoxy polyoxyethylene ethanol, hydrolyzed polyvinyl acetate, and the like. For the sake of uniformity of comparative data and in order to secure a better correlation of the other components of the polymerization reaction, 88% hydrolyzed polyvinyl acetate is employed as the dispersant in the examples hereinafter set out. It is to be understood that this is not intended to be limitative.

In the practice of the present invention the materials are charged into the polymerization chamber, which may be any of the polymerization receptacles commonly used for such reactions, the polymerization chamber having been first purged with nitrogen to remove all traces of air. First the vinyl chloride, and other monomers when copolymers are being made, is added to the chamber and then the THF. Next the reaction medium or water is charged and then the dispersant is added. If desired, the reaction medium and dispersant may be admixed before charging. The catalyst is the last item added. Since the order in which materials are added to the polymerization chamber is not critical, any order may be employed. It is usually desirable, however, to add the catalyst last. The polymerizer is placed in a suitable bath or is jacketed and is maintained at a predetermined temperature throughout the polymerization reaction.

The heat stability of the polymers or resins of the present invention is measured by a test which is referred to as the "capillary viscosity heat stability test" and is hereinafter referred to as the "CVHS" test. This test is adequately described in an article appearing in the "Journal of Applied Polymer Science", Vol. 10, pages 1573–1589 (1966). By use of the CVHS test, there is determined the time it takes for the polymer or resin to turn an orange color when extruded through a capillary under pressure, at a constant rate, and at a predetermined temperature. This time is measured in minutes and, accordingly, the heat stability of the polymers or resins is expressed in minutes. Normally, polymers prepared in the absence of THF will have a heat stability of about 8 minutes or less. On the other hand, polymers or resins produced in accordance with the present invention have a heat stability in the range of about 15 to about 21 minutes, which, as can be seen, is two times or more than that of the usual prior polymers, that is, those made in the absence of THF and without correlated controlled temperature conditions during the polymerization reaction. This new and unexpected improvement in heat stability can be clearly seen in the examples, which follow hereinafter.

In the following specific examples, which are intended to be illustrative and not limitative, all parts and percents are by weight unless otherwise indicated.

EXAMPLE I

In this example, 2 samples of polyvinyl chloride were prepared, one a control and the other employing the process of the present invention. The polymerization vessel was charged with each of the following formulations in separate reactions:

|  | Control | Exp. 1 |
| --- | --- | --- |
| Vinyl chloride | 1000 gms. | 870 gms. |
| THF | — | 130 gms.* |
| Polyvinyl alcohol (dispersant) | 4 gms. | 4 gms. |
| Water | 2000 gms. | 2000 gms. |
| Sec. butyl peroxydicarbonate (catalyst) | 0.5 cc. | 0.5 cc. |

*Amount of THF = 15 parts based on 100 parts by weight of monomer.

After purging the reactor with nitrogen, the vinyl chloride was first added and in Exp. 1 the THF was added with the monomer. The water was mixed with the dispersant in each case and added next and lastly the catalyst was added and the reaction started. The control was polymerized at 70° C. until a conversion of 76% was reached. In the case of Exp. 1, the reaction was conducted at 40° C. until a conversion of 75% was reached. The polymers were recovered from the reactor, washed in methanol to remove residual THF and dried and CVHS tests run with the following results:

|  | Control | Exp. 1 |
| --- | --- | --- |
| 220° C. - Extrusion load in lbs. | 49 | 51 |
| CVHS - In minutes | 8 | 15 |

These test results show that by means of this invention one is able to produce a polymer having the same flow characteristics as are produced by standard procedures, at a temperature lower than usual, but having twice the heat stability. The combination of low temperature of polymerization and use of THF accomplished this result.

EXAMPLE II

In this Example a series of polymers from vinyl chloride were prepared, as in Example I, except that catalyst and conditions were varied, as well as with and without the use of THF. CVHS tests wre run as before. The following Table 1 sets forth the conditions and results.

TABLE 1

| Experiment No. | Catalyst | CC's Cat. | Polymerization Temp. ° C. | Parts THF | % Conversion | 220° C. Extrusion Load in Lbs. | CVHS in minutes |
| --- | --- | --- | --- | --- | --- | --- | --- |
| 2 | di(sec-butyl) peroxydicarbonate | 0.4 | 40 | 0 | 86 | 640 | 8 |
| 3 | di(sec-butyl) peroxydicarbonate | 0.5 | 40 | 54 | 78 | 1.5 | 15 |
| 4 | di(iso-butyl)peroxide | 2.0 | 25 | 0 | 73 | 825 | 17 |
| 5 | di(iso-butyl)peroxide | 3.0 | 25 | 15 | 72 | 200 | 21 |
| 6 | di(iso-butyl)peroxide | 3.5 | 25 | 0 | 86 | 900 | 10 |
| 7 | di(sec-butyl) peroxydicarbonate | 0.7 | 40 | 100 | 73 | less than 0.5 | 6 |

Comparison of Experiments 2 and 3 show the increased heat stability when employing THF at a lowered temperature of polymerization and reduced conversion of monomer to polymer. When 5 is compared to 3 one notes that at still lower temperature the heat stability is further enhanced. On the other hand, when a large or substantial quantity of THF is employed, there is a great drop in heat stability as witness Experiment No. 7. The data obtained in Examples I and II graphically illustrate the unexpected properties obtained using the process of the present invention.

It can be readily seen, from the dispersion hereinbefore, that the present invention provides a new process for producing vinyl chloride polymers having greatly enhanced thermal stability characteristics. Further, such polymers have an improved relationship between heat stability and polymer melt flow, which is indicative of proper molecular weight. As a result of these improved properties, when compounds are made employing said polymers, one obtains noticeably improved processability which is important in many end uses, such as in bottle blowing, molding, film-forming processes, and other like operations. Many other advantages of the present invention will be apparent to those skilled in the art.

Although the invention has been described in terms of its specific embodiments, certain modifications and equivalents will be apparent to those skilled in the art and are intended to be included within the scope of the present invention, which is to be limited only by the reasonable scope of the appended claims.

We claim:

1. In a process for the suspension or dispersion polymerization of a monomeric system containing 80% or more of vinyl chloride and 20% or less of one or more vinylidene monomers containing a terminal $CH_2=C<$ group selected from vinylidene chloride, vinyl esters, esters of acrylic acid and methacrylic acid, maleate and fumarate esters, ethylene, propylene and butylene in the presence of 0.001 to 1.0 part, based on 100 parts of monomer or monomers, or a monomer-soluble peroxide catalyst, the improvement wherein the polymerization is carried out in an aqueous medium at a temperature in the range of about 0° to 40° C. and in the presence of about 5 parts to about 50 parts by weight, based on 100 parts by weight of the monomer or monomers, of tetrahydrofuran, said polymerization being continued to a point no greater than 80% conversion of monomer or monomers to produce a polymer having a capillary viscosity heat stability in the range of about 15 to about 21 minutes.

2. A process as defined in claim 1 wherein the vinylidene monomer is vinylidene chloride.

3. A process as defined in claim 1 wherein the vinylidene monomer is ethyl acrylate.

4. A process as defined in claim 1 wherein the vinylidene monomer is vinyl acetate.

5. A process as defined in claim 1 wherein the temperature is 40° C. and the amount of tetrahydrofuran is in the range of 5 parts to 30 parts by weight, based on the weight of the monomeric system.

6. A process as defined in claim 5 wherein the vinylidene monomer is vinylidene chloride.

7. A process as defined in claim 5 wherein the vinylidene monomer is ethyl acrylate.

8. A process as defined in claim 5 wherein the monomeric system contains 100% vinyl chloride, the temperature is 25° C. and the amount of tetrahydrofuran is in the range of 5 parts to 50 parts by weight, based on the weight of the vinyl chloride.

9. A process as defined in claim 1 wherein the monomeric system contains 100% vinyl chloride, the temperature is 15° C., and the amount of tetrahydrofuran is 15 parts by weight.

* * * * *